United States Patent
Kimball et al.

(10) Patent No.: US 6,559,692 B2
(45) Date of Patent: *May 6, 2003

(54) OUTPUT DRIVER FOR A 10BASET/100BASETX ETHERNET PHYSICAL LAYER LINE INTERFACE

(75) Inventors: Eric Kimball, Austin, TX (US); Perry Heedley, Folsom, CA (US); Baker Scott, Boulder, CO (US); Eric Smith, Austin, TX (US); Stephen Hodapp, Austin, TX (US); Sumant Ranganathan, Folsom, CA (US); Mohammad Navabi, Phoenix, AZ (US)

(73) Assignee: Cirrus Logic, Inc., Austin, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/299,051

(22) Filed: Apr. 23, 1999

(65) Prior Publication Data

US 2002/0060587 A1 May 23, 2002

Related U.S. Application Data

(60) Provisional application No. 60/082,919, filed on Apr. 24, 1998, provisional application No. 60/082,917, filed on Apr. 24, 1998, and provisional application No. 60/082,918, filed on Apr. 24, 1998.

(51) Int. Cl.[7] .............................................. H03B 1/00
(52) U.S. Cl. ...................... 327/109; 327/333; 327/363; 330/260; 326/86
(58) Field of Search ....................... 327/108–111, 530, 327/535, 538, 539, 541, 560–563, 362, 363, 378, 333, 512, 513; 326/32, 31, 26, 33, 27, 34, 28, 82–91; 307/412; 330/251–254, 259–261; 336/277, 278, 290, 291

(56) References Cited

U.S. PATENT DOCUMENTS

| | | | | |
|---|---|---|---|---|
| 4,999,519 A | * | 3/1991 | Kitsukawa et al. | 326/110 |
| 5,072,136 A | * | 12/1991 | Naghshineh | 326/126 |
| 5,491,448 A | * | 2/1996 | Naokawa et al. | 330/264 |
| 5,808,501 A | * | 9/1998 | Ivanov | 327/333 |
| 6,037,832 A | * | 3/2000 | Kaminishi | 327/538 |

* cited by examiner

Primary Examiner—Timothy P. Callahan
Assistant Examiner—Minh Nguyen
(74) Attorney, Agent, or Firm—Steven Lin, Esq.

(57) ABSTRACT

A multi-path unity gain buffer circuit and method are implemented in a slew amplifier. The multi-path unity buffer has a high frequency signal path and a low frequency signal path. The high frequency signal path has a differential amplifier powered for providing a high frequency, low accuracy buffering operation. The low frequency signal path is coupled to the high frequency signal path. The low frequency signal path has an operational amplifier powered to provide a low frequency, high bandwidth buffering operation. An output of the operational amplifier is fed back to an input of the operational amplifier through a current varying element that varies current levels of the input of the operational amplifier to remove a level shift of an output signal of the differential amplifier.

18 Claims, 11 Drawing Sheets

OUTPUT DRIVER FOR A 10BASET/100BASETX ETHERNET PHYSICAL LAYER LINE INTERFACE

CROSS REFERENCE TO RELATED APPLICATIONS

This application is a Continuation-in-Part of a Provisional Patent Application filed on Apr. 24, 1998, Ser. No. 60/082,919, which is a application with U.S. patent application Ser. No. 60/082,917, filed Apr. 24, 1998 entitled, "TIMING RECOVERY SYSTEM FOR A 10BASET\100BASET ETHERNET PHYSICAL LAYER LINE INTERFACE" and U.S. patent application Ser. No. 60/082,918, filed Apr. 24, 1998 entitled "EQUALIZER FOR A 10BASET\100BASETX ETHERNET PHYSICAL LAYER LINE INTERFACE".

TECHNICAL FIELD OF THE INVENTION

The present invention pertains in general to Ethernet transceivers and, more particularly, to an output driver for an Ethernet interface.

BACKGROUND OF THE INVENTION

Local area networks (LAN) are utilized to interconnect computers, terminals, word processors, facsimile and other office machines within a facility. Although a definition of a local area network can encompass many systems, it is typically directed toward systems that provide for high-speed transmission with typical data rates in the range of 50 Kb\s to 150 Mb\s, which utilizes some type of switching technology and is embedded within some form of network topology. The various technologies necessary to implement a local area network include transmission, switching and networking.

Local area network transmission is achieved in many ways, by transmitting over coax, twisted pairs or even optical fibers. Some of these medias, such as the twisted pair medium, are limited in bandwidth. The media is utilized to transmit reference data, with the data being transmitted in the baseband. Typically, data rates as high as 100 Mb\s have been transmitted by using baseband coding techniques such as Manchester Coding, the most prominent of which is the Ethernet, which provides for transmission at either a 10 BASE-T or 100 BASE-T. These are well known standards.

When transmitting data over an Ethernet Interface, the data is transmitted as a sequence of "symbols" which involve transmission of logic states at different levels. In one technique, a multi-level technique, a symbol can be at a positive level, a zero level or a negative level. The next symbol will be at the same level or will be at a different level yielding a transition between the two symbols. When transmitting the sequence of symbols, bandwidth is a consideration due to interference that occurs over the line from one end to the next. This interference can be due to such things as inter-symbol interference, near-end cross talk, etc. All of this noise will degrade the signal, which degradation must be accounted for. Typical solutions to this signal degradation is to use some type of equalizer, reduce clock jitter, etc.

SUMMARY OF THE INVENTION

The present invention disclosed and claimed herein comprises a method for controlling the output voltage variation over temperature for an impedance control line driver which comprises a driver having a constant output impedance with an external resistor provided for comparing to an internal resistor and controlling the current provided therefrom as a function of temperature. The driver includes a switched current and driver that generates bipolar currents and circuitry for controlling the current provided therefrom as a function of temperature.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION OF THE INVENTION

Figure 1A:
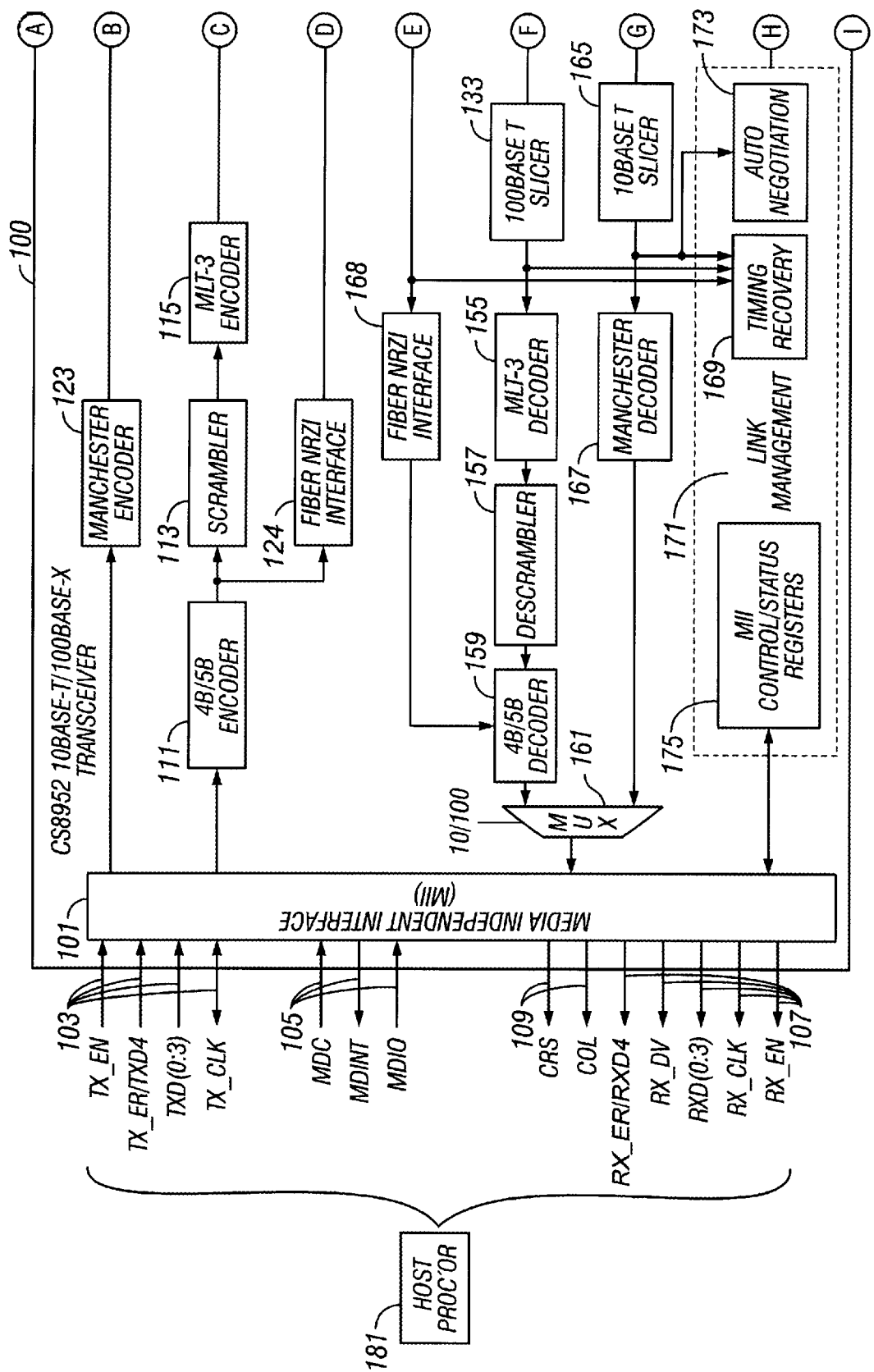
FIG. 1 illustrates an overall block diagram of the transceiver.
Figure 1B:
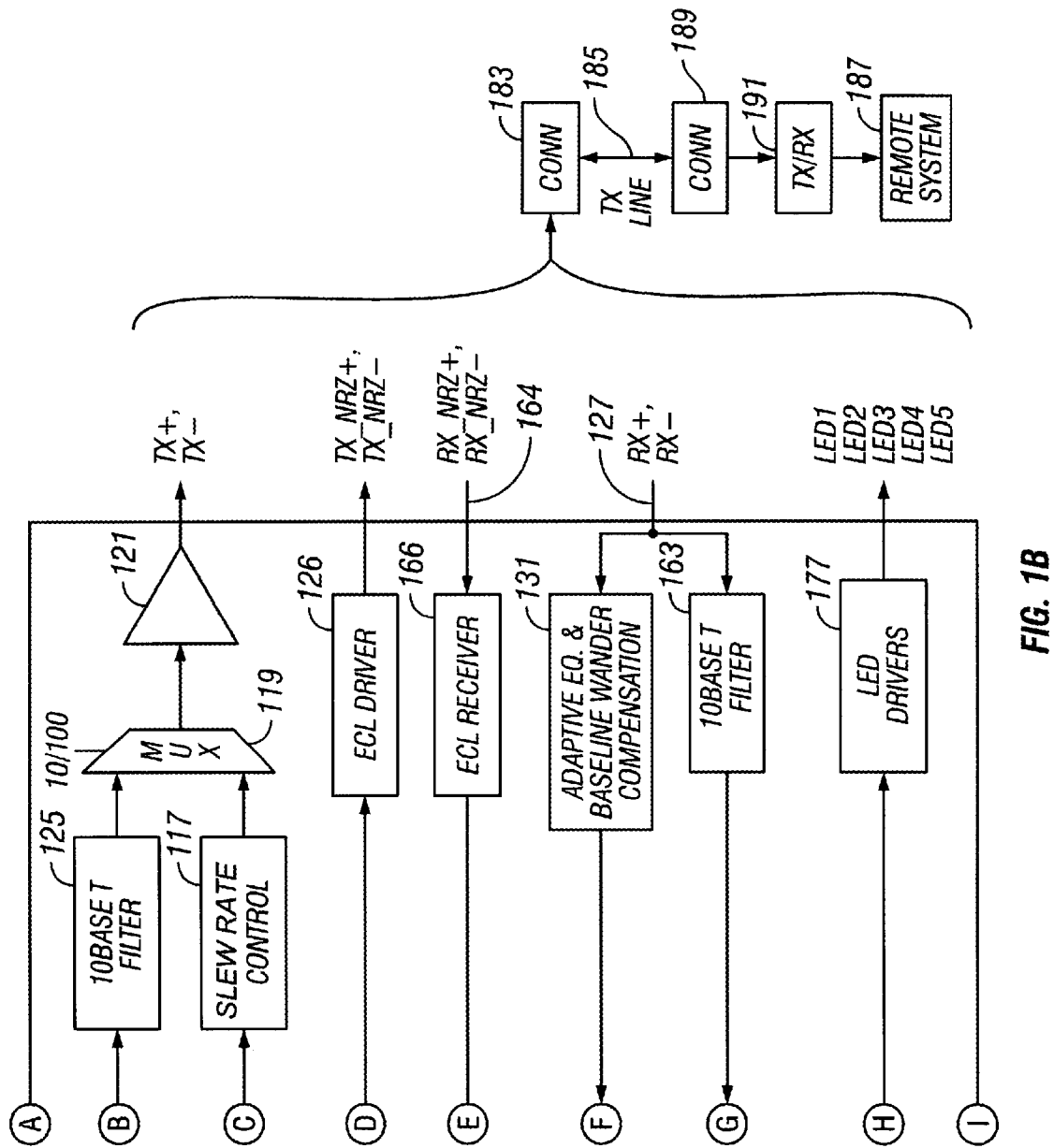

Referring now to FIG. 1, there is illustrated a block diagram of an Ethernet Transceiver for 100 BASE-X and 10 BASE-T applications. In general, it provides a physical coding sublayer for communication with an external Media Access Controller (MAC). The primary digital interface to the transceiver is an enhanced IEEE 802.3 Media Independent Interface (MII) 101. The MII 101 supports parallel data transfer, access to internal control and status registers of the transceiver and several status and control pins associated therewith. The MII 101 has various interface pins associated therewith. These are divided into a number of classes. There are provided seven transmit interface pins 103 comprised of four transmit data pins, these providing a parallel data path, a transmit clock, TXCLK, a transmit enable pin, TXEN, which indicates when transmit data is present and valid, and a TXER\TXD4 pin which is a pin for requesting to transmit a 100BaseTX HALT symbol. There are provided three register access pins 105, which provide a bidirectional serial data path, MDIO, a clock for the MDIO, MDC, which has a 16.7 MHz maximum frequency, and an MIIIRQ interrupt pin for indicating a change in register status. There are provided nine receive data pins 107, four receive data pins RXD, a receive clock output pin, RXCLK, a valid receive data pin, RXDV, indicating when receive data is presently valid, a receive data error pin, RXER\RXD4, and a receive enable pin, RXEN, which is used to tri-state the receive output pins. There are also provided two status pins 109 which provide collision indication COL, and a carrier sense indication, CRS.

The MII Interface 101 provides a 5-bit transmit data path and an independent 5-bit receive data path. In the 100BaseTX and 10BaseT modes, 4-bit wide is sent across the MII Interface 101 on TXD[3:0]\RXD[3:0], while TXD4\RXD4 is ignored. In 100BASE-T mode, 4-bit data is translated into 5-bit symbols transmitted on the medium utilizing an encoding scheme. In the 10BASE-T mode, the 4-bit data is not encoded/decoded. In the repeater mode, the 5-bit symbol is transmitted across the MII Interface 101 on the TXD[4:0]\RXD[4:0]. A serial management interface is also included to provide access to configuration and status registers.

The MII Interface 101 utilizes TTL signal levels which are compatible with devices operating at a nominal supply voltage of either 5.0 or 3.3 volts. It is capable of supporting either 10 Mb\s or 100 Mb\s data rates transparently; that is, all signaling remains identical at associated data rate except the nominal clock frequency.

Transmitted data across the MII Interface 101 is processed in either the 10BaseT mode or the 100BaseTX mode. In the 100BaseTX mode, the data is transmitted to a 4-bit-to-5-bit (4B\5B) translator 111 which translates the 4-bit data to the 5-bit symbols transmitted on the medium. This is transmitted to a scrambler 113 which is a stream cipher scrambler. The data is scrambled by the modulo-2 addition of a pseudorandom sequence to the plain-text data. The output of scrambler 113 is an input to an MLT-3 encoder 115, the encoded data then input to a slew rate control circuit 117 and into a multiplexer 119. The output of the multiplexer 119 is input to a driver 121 to provide an output.

For the 10BaseT mode, the data is bypassed around the encoder 111 to decrease latency and the 5-bit symbol is processed through a Manchester Encoder block 123 and then through a filter 125 to the multiplexer 119. The multiplexer 119 selects between the two paths for output to the driver 121. The transceiver of FIG. 1 also provides a path for transmitting data to an optical fiber. The output of the encoder 111 is input to a fiber NRZI interface block 124 and then to an ECL driver 126 to provide on the output thereof the NRZ transmit signals.

In the receive mode, data will be received from the twisted pair on an input line 127 and processed along two paths, one path associated with a 10BaseT mode and one path associated with the 100Base-X mode. In the 100Base-X mode, the signal is first received by an adaptive equalizer 131 which is operable to process the receive signal through an equalizer function, as will be described hereinbelow in more detail. This block 131 also provides base line wander compensation, which will also be described hereinbelow. The output of the block 131 is then processed through a 100Base-X slicer 133 and then to an MLT-3 decoder 155. This is then processed through a descrambler 157. The descrambler allows plaintext to be recovered by subtracting off (modulo 2) the identical pseudorandom sequence that was added to the ciphertext. This is then passed through a 5-bit-to-4-bit (5B/4B) decoder 159 and then to the input of a multiplexer 161. The output of the multiplexer 161 is then put to the MII interface 101. For the 10BaseTpath, the received signal is input to a filter 163, the output thereof processed through a 10BaseT slicer 165 and the output thereof processed through a Manchester decoder 167. The output of the Manchester decoder 167 is input to the other input of the multiplexer 161, the multiplexer 161 controlled by a control signal for selecting the paths.

For an optical fiber, the receive signal is received on an input 164, which is input to an ECL receiver 166, the output thereof input to a fiber NRZI interface 168. The output of the interface 168 is input to the 5B/4B decoder 159.

The clock recovery is performed by a timing recovery block 169, which receives the inputs from the output of the slicers 133 or 165, depending upon the path selected, and from the output of the ECL receiver 166 when the data is transmitted over a fiber optic node. The timing recovery block 169 is operable to recover the clock and timing information contained in the received signal. The timing recovery block 169 is part of a link management block 171, which also contains an auto-negotiation block 173. Auto-negotiation is the mechanism that allows the two devices on either end of an Ethernet link segment to share information that automatically configures both devices for maximum performance. The transceiver in the auto-negotiation mode will detect and automatically operate full-duplex at 100 Mb/s if the device on the other end of the link segment also supports full-duplex, 100 Mb/s operation, at auto-negotiation. The auto-negotiation capability is fully complied with the relevant portions of Section 28 of the IEEE 802.3 u standard.

In the auto-negotiation mode, the transceiver can auto-negotiate both operating speed (10 vs. 100 Mb/s) and duplex mode (half duplex vs. full duplex), or alternatively can receive instructions indicating that the transceiver is not to negotiate. This feature is selected via the state of two input pins AN0 and AN1 (not shown). The link management layer also contains control and status registers in a block 175 which are utilized by the MII interface 101. The link management control 171 is operable to provide outputs on five LEDs which are driven by a driver block 177.

Figure 2A:
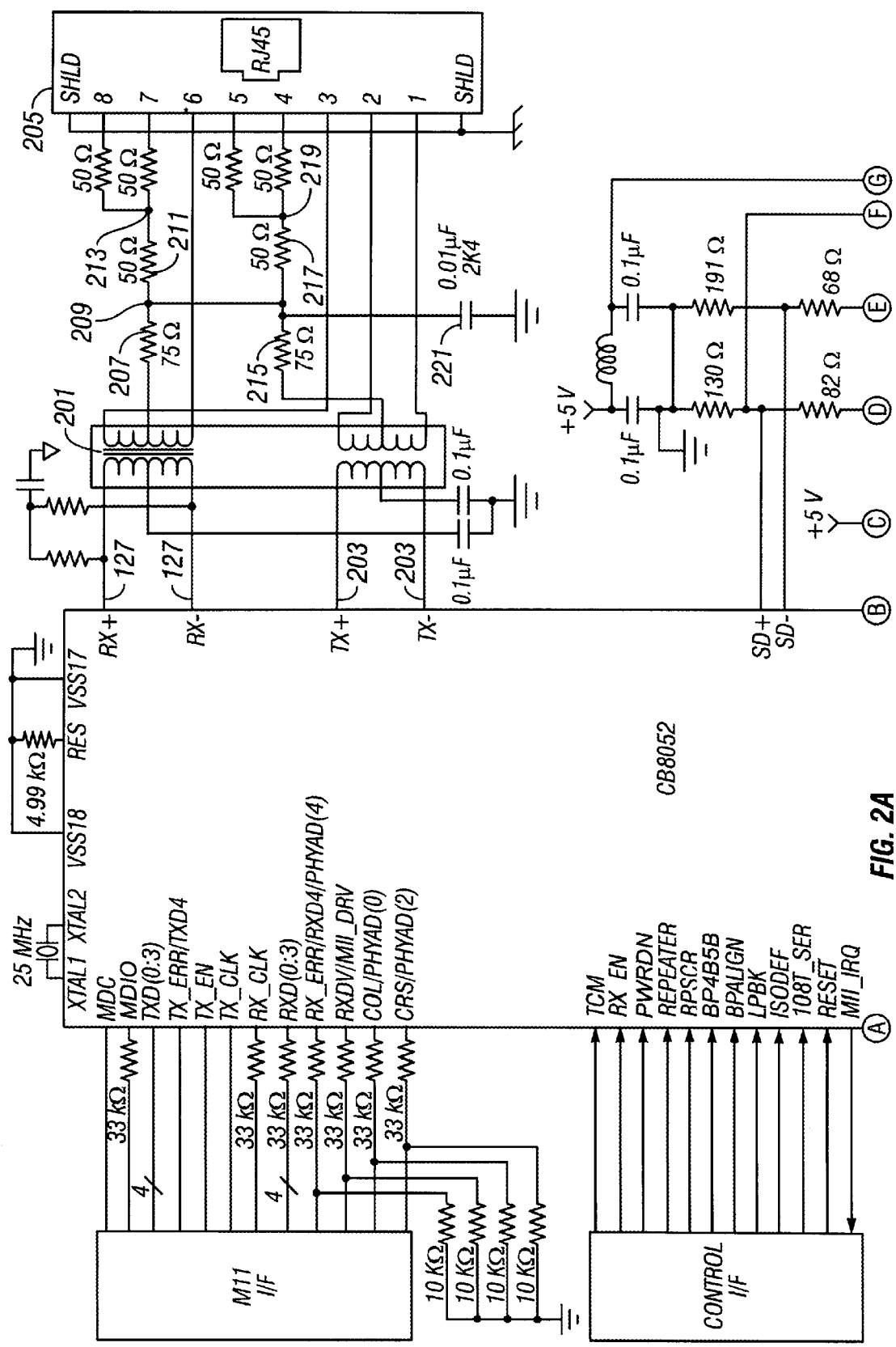
FIG. 2 illustrates an interconnection diagram for both the twisted wire pair and the fiber optic connection.
Figure 2B:
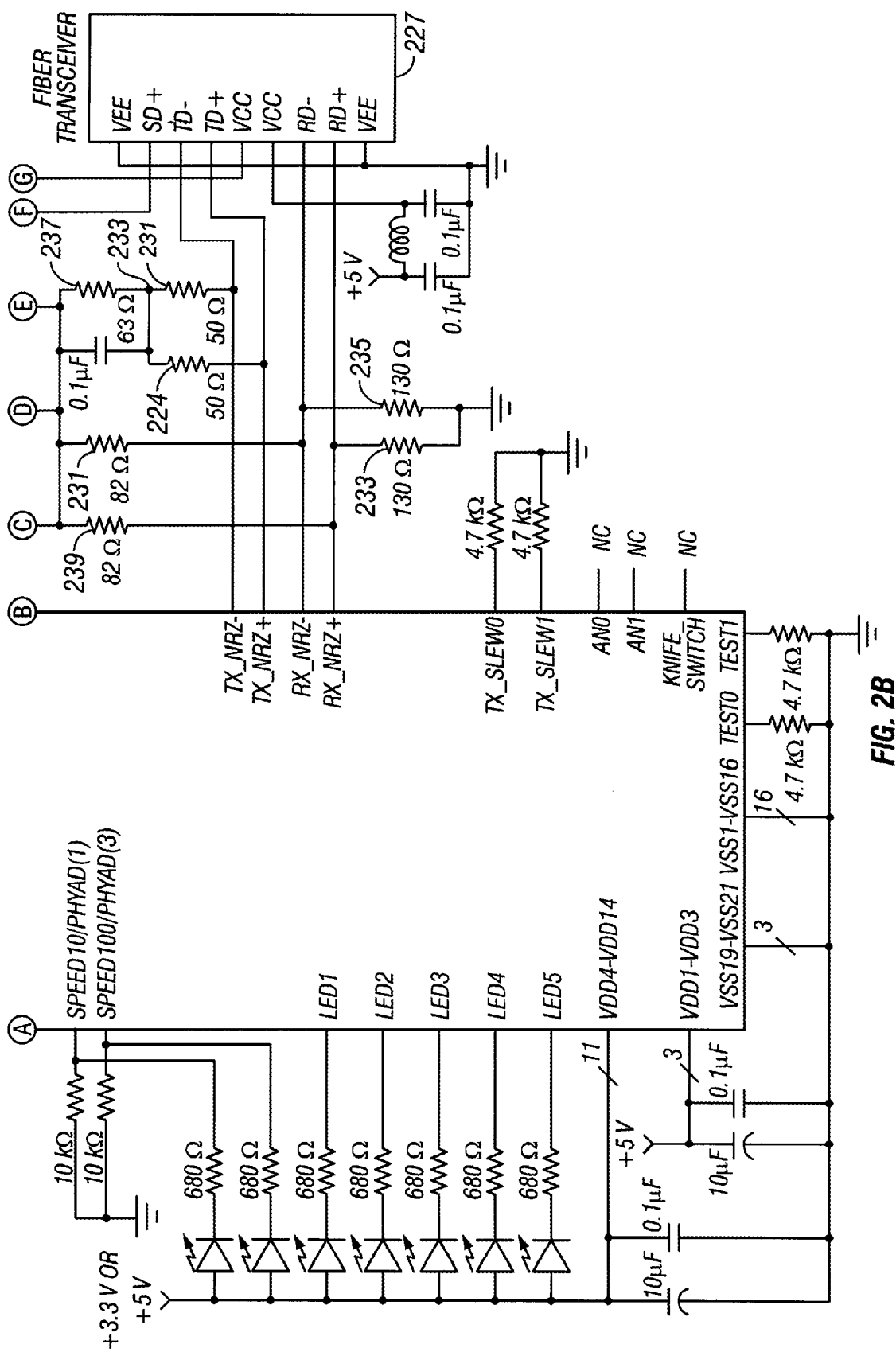

Referring now to FIG. 2, there is illustrated an interconnection diagram for the transceiver connected to a twisted wire pair and also connected to a fiber optic interface. The receive terminals 127 are connected to a transformer 201, there being a positive and a negative receive terminal. Similarly, transmit terminals 203 are also connected to the transformer 201. The transformer 201 is operable to provide on the opposite side thereof two balanced outputs associated with the receive input which are connected to two terminals of an RJ45 connector 205. The center tap of the transformer on the connecter side of the transformer 201 is connected through a first series resistor 207 to a node 209, node 209 connected through a second resistor 211 to a node 213. Node 213 is connected through a first resistor to one terminal of the connector 205 and through a second resistor to the connector 205. Resistor 207 is 75 Ohms in value and the remaining resistors 211 and the two resistors connected to node 213 are 50 Ohms.

The other side of the transformer 201 for the transmit signal are comprised of two balanced outputs and a center tap output. The two balanced outputs are connected to two pins on the connector 205 and the center tap is connected through a first resistor 215 to the node 209, node 209 also connected through a second resistor 217 to a node 219. Node 219 is connected through two resistors to two separate pins on the connector 205. A capacitor 221 is connected between node 209 and ground. Resistor 215 is the same value as resistor 207 and resistor 217 is the same value as resistor 211, the remaining two resistors connected to node 219 also being the same value as resistor 217.

The fiber optic transmit terminals from ECL driver 126 and the receive terminals 164 are input to a fiber optic transceiver 227. The transmit terminals are differential outputs and are connected through two resistors 229 and 231 to a node 233. Node 233 is connected through a resistor 237 to the positive supply. The receive input 164 is a differential input having two wires connected through respective resistors 239 and 241 to the positive supply and through two respective resistors 233 and 235 to ground.

Figure 3:
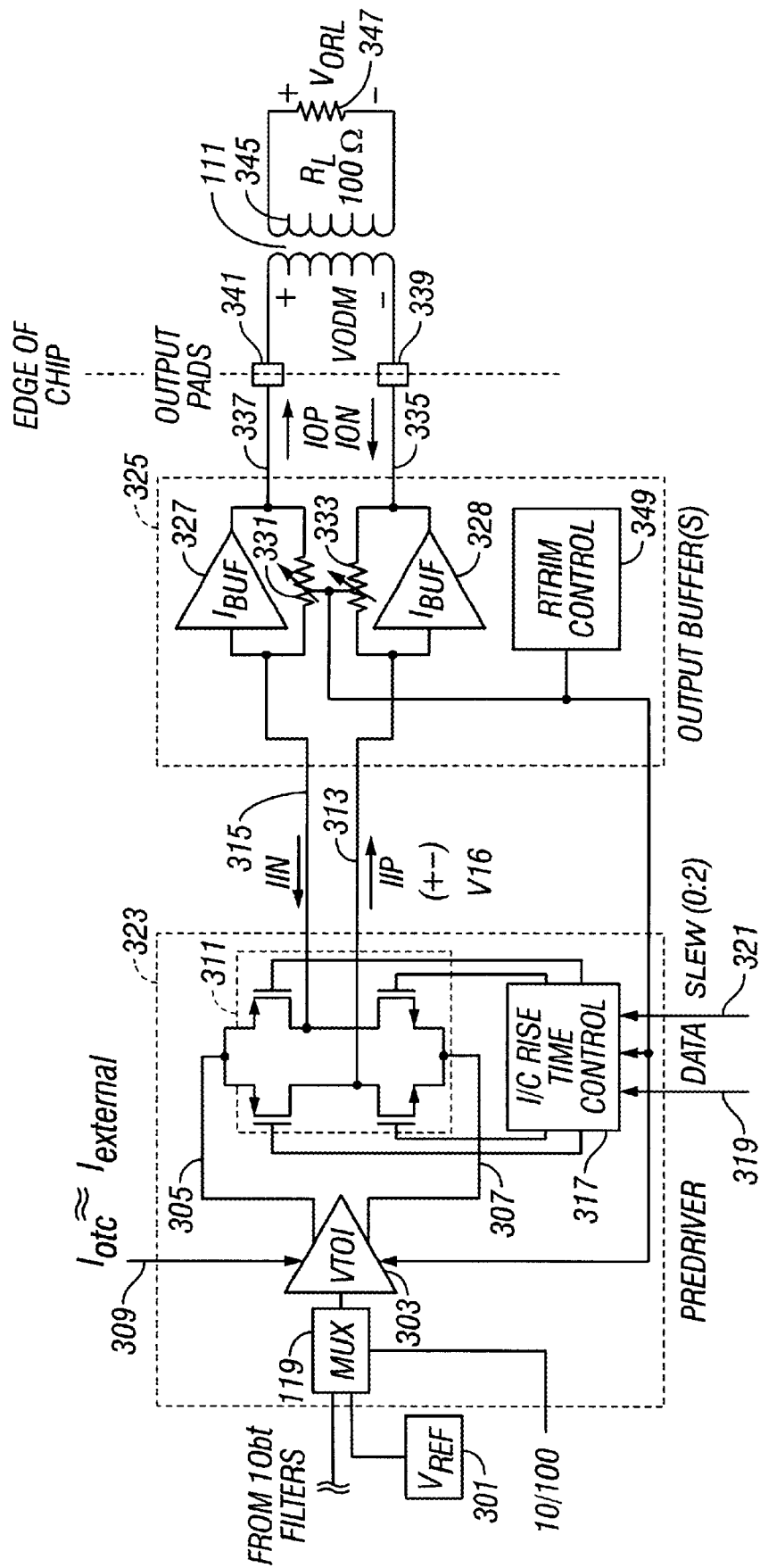
FIG. 3 illustrates a circuit diagram for the output buffer.

Referring now to FIG. 3, there is illustrated a circuit diagram for the output buffer 121. The output buffer 121, as described hereinabove, operates in two modes, it operates to receive the 10BaseT mode or in the 100BaseTX mode. In the 10BaseT mode, the encoded signal is received from the filter 125 and then is processed in a conventional manner, as will be described hereinbelow. In the 100BaseTX mode, a reference voltage $V_{RF}$ indicated in a block 301 is selected by the multiplexer 119. The output of the multiplexer 119 is input to a voltage-to-current converter 303 which is operable to provide on the output thereof two differential currents on lines 305 and 307, respectively. Additionally, as will be described in more detail hereinbelow, the V-to-I converter 303 is operable to receive a zero temperature coefficient current $I_{O_{tc}}$ on a line 309 which is summed with the current generated by the V-to-I converter 303. This current is then input to a current switch 311 which current switch 311 is operable to switch the current in a predetermined manner to provide on the output thereof a positive current on a line 313 and a negative current on a line 315. The current switch 311 is controlled by a rise time control circuit 317, which is operable primarily in the 100BaseTX mode to receive data on a line 319 and provide switching in such a manner to minimize distortion, as will be described hereinbelow. In addition, the rise time control circuit 317 is programmable in response to a 3-bit slew input on a line 321 which controls the rise time. The V-to-I converter 303 and the current switch 311 comprise a pre-driver 323.

The output of the pre-driver 323, the current on lines 313 and 315, is input to an output buffer section 325. The output buffer section 325 includes first and second current buffers 327 and 328, the current buffer 327 having a trimmable internal impedance 331 associated therewith and the current buffer 328 having a trimmable output impedance 333 associated therewith. The current buffer 328 is operable to receive on the input thereof the current on line 313 and provide on the output thereof a current $I_{on}$ for the negative output current on an output line 335. The current buffer 327 is operable to receive on the input thereof the current on line 315 and provide on the output thereof an output current $I_{op}$ on a line 337. Line 335 is connected to a terminal 339 and line 337 is connected to a terminal 341, terminal 339 being the negative terminal and terminal 341 being the positive terminal. This is input to a 1:1 transformer 345, which has a load resistance 347 disposed thereacross on the opposite side to the terminals 339 and 341. This provides the voltage $V_O$ across resistor 347. The internal impedances of buffers 327 and 328, represented by resistors 331 and 333, are trimmable as well as the operation of the V-to-I circuit 303. This is provided by a trim control circuit 349.

Figure 4:
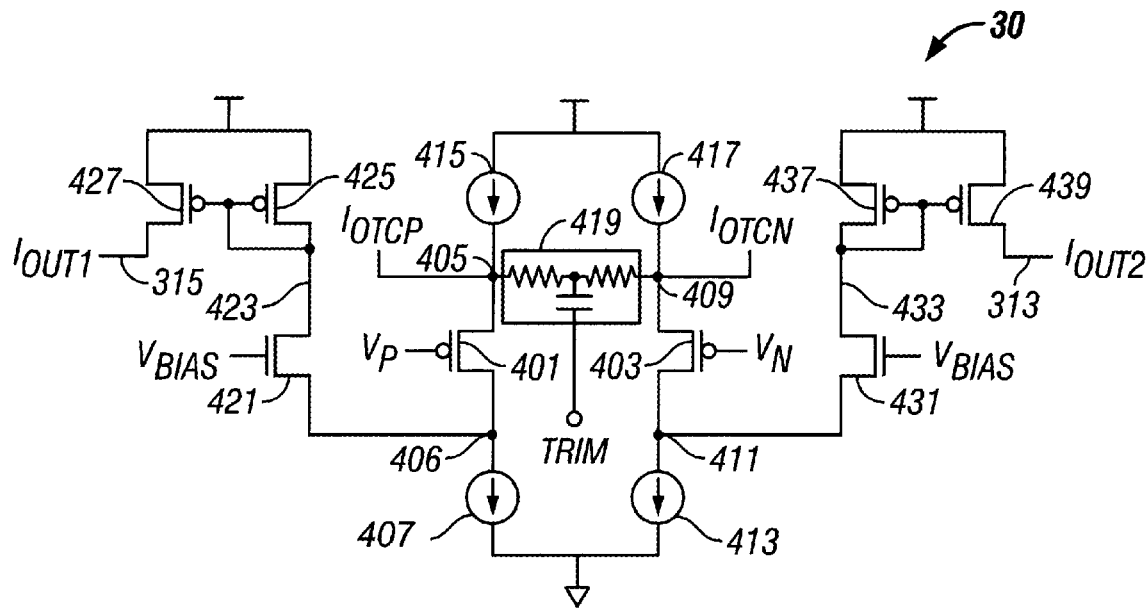
FIG. 4 illustrates a schematic diagram of the V-to-I circuit.

Referring now to FIG. 4, there is illustrated a schematic diagram of the V-to-I converter 303. The differential voltage that is output from the multiplexer 119 is comprised of a positive voltage $V_p$ and a negative voltage $V_n$, the positive voltage being input to the gate of a P-channel transistor 401 and the negative voltage being input to the gate of a P-channel transistor 403. P-channel transistor 401 has the source/drain path thereof connected between a node 405 and the other side thereof connected to a node 406. Node 406 is connected to one side of the current source 407, the other side thereof connected to ground. The source/drain path of transistor 403 is connected on one side to a node 409 and on the other side thereof to a node 411. Node 411 is connected to one side of the current source 413, the other side thereof connected to ground. Node 405 is connected to one side of a current source 415, the other side thereof connected to a positive supply node and node 409 is connected to one side of a current source 417, the other side thereof connected to the supply node. A resistor network 419 is connected between nodes 405 and 409 and this network is a trimmable network. This is comprised of two selectable series resistors with the capacitor connected to ground at the interconnection therebetween. In general, this will provide a trimmable series resistance between nodes 405 and 409 and will operate to vary the conversion rate thereof, as it provides a current path between nodes 405 and 409.

Node 406 is connected to one side of the source/drain path of an N-channel transistor 421, the gate thereof connected to a bias voltage $V_{bias}$, the other side of the source/drain path thereof connected to a node 423. Node 423 is connected to one side of the source/drain path of a P-channel transistor 425, the other side thereof connected to the supply node and the gate thereof connected to node 423. The gate of transistor 425 is connected to the gate of a P-channel transistor 427, the source/drain path thereof connected between the supply node and the current node 315. Node 411 is connected to one side of the source/drain path of an N-channel transistor 431, the gate thereof connected to the bias voltage $V_{bias}$ and the other side of the source/drain path thereof connected to a node 433. Node 433 is connected to one side of the source/drain path of a P-channel transistor 437, the other side thereof connected to the supply node and the gate thereof connected to node 433. The gate of transistor 437 is also connected to the gate of a P-channel transistor 439, the source/drain path thereof connected between the supply node and the output current line 313.

Figure 5:
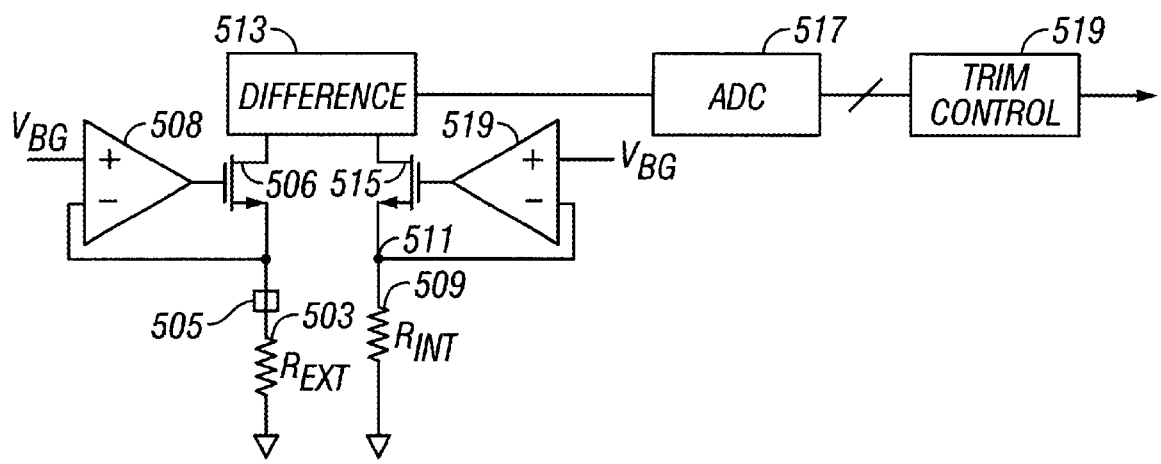
FIG. 5 illustrates a block diagram of a trim control circuit.

Referring now to FIG. 5, there is illustrated a block diagram of the trim circuit 349. The trim control circuit 349 is basically a circuit for generating two currents, one associated with an external resistor and one associated with an internal resistor, with the currents being forced to provide a band gap voltage across to the two resistors. An external resistor 503 is provided that is connected between an external path 505 and ground. The external path 505 is connected to one side of the source/drain path of an N-channel transistor 506, the other side thereof connected to a difference circuit 513. The gate of transistor 506 is connected to the output of an amplifier 508, the positive input thereof connected to the band gap voltage reference $V_{BG}$. The band gap generator is standard circuitry for generating an internal voltage that is substantially temperature compensated and stable. The negative input of amplifier 508 is connected to the external path 505. As such, the band gap $V_{BG}$ will be forced across resistor 503. The current through transistor 506 will be proportional to the band gap voltage and the resistor, the only term that varies being of resistance in resistor 503, which is labeled $R_{ext}$. An internal resistor 509 is provided which is connected between a node 511 and ground. Node 511 is connected to the one side of the source/drain path of transistor 515 and the other side thereof connected to the difference circuit 513. The gate of transistor 515 is connected to the output of an amplifier 519, which has the positive input thereof connected to the band gap voltage $V_{BG}$ and the negative input thereof connected to node 511. As such, the current through resistor 509 is controlled such that the voltage thereacross is the band gap voltage $V_{BG}$. Therefore, the current through resistors 503 and 509 is a function of the size of the resistors and the difference therebetween will vary only as a function of the variations in the two resistors over temperature, etc.

The output of the difference circuit 513 is input to an analog-to-digital converter (ADC) 517, which is then input to a trim control circuit 519, which is operable to switch in and out internal resistors which are formed from p+resistors disposed elsewhere in the transmitter, this being a digital control signal.

Figure 6:
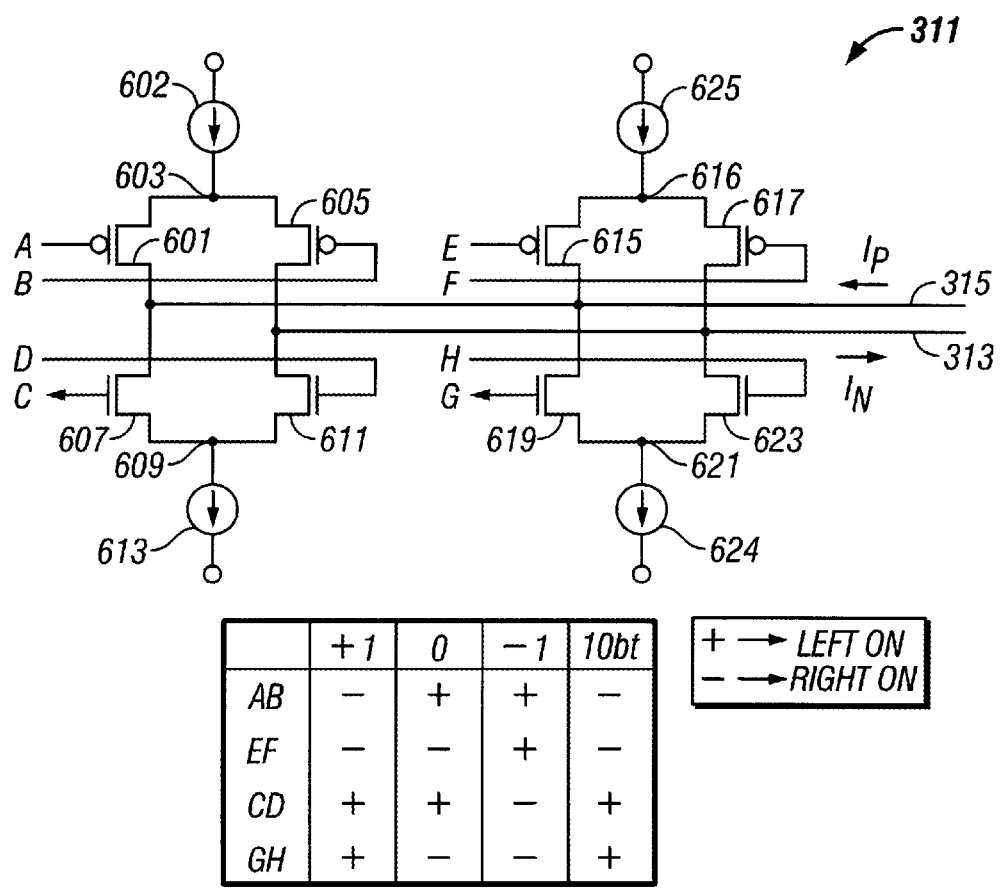
FIG. 6 illustrates a schematic diagram of the current switch.

Referring now to FIG. 6, there is illustrated a schematic diagram of the current switch 311. The present invention utilizes a fully differential architecture, the object of which is to switch current from one direction to the other and to provide a "0" current for the "0" logic state or level. The first differential structure is provided by a P-channel transistor 601 connected between a node 603 and the output node 315, the gate thereof connected to a switch signal "A." A second P-channel transistor 605 is connected between node 603 and the output terminal 313, the gate thereof connected to the switch signal "B." A current source 602 represents current into the node 603, which current is derived from the V-to-I converter 303 on the line 305, this being the positive current. An N-channel transistor 607 is connected between node 315 and a node 609, with the gate thereof connected to a "C" switch input. An N-channel transistor 611 is connected between node 313 and the node 609, with the gate thereof connected to a switch input "D." A current source 613 is connected to node 609 to draw current therefrom, representing the current to node 307. It should be remembered that the current provided by current source 602 and the current provided by current source 613 is determined by the V-to-I converter 303 with the $V_{REF}$ voltage in block 301 selected for the 100BaseTX mode and the actual input selected from the 10BaseT line during that mode of operation.

A second differential structure is provided by a P-channel transistor 615, connected between a node 616 and the node 315, the gate of transistor 615 connected to a switch control "E." A P-channel transistor 617 is connected between node 616 and node 313, with the gate thereof connected to a switch control "F." An N-channel transistor 619 is connected between node 315 and a node 621, the gate thereof connected to the switch input "G." An N-channel transistor 623 is connected between node 313 and node 621, the gate thereof connected to a switch input "H." A current source 624 draws current from node 621 and is substantially identical to current source 613, i.e., it is connected to node 307 that represents the current on the line 307. A current source 625 is operable to represent the current to node 16 from line 305 output from the V-to-I converter 303.

In operation, the transistors 601 and 605 are considered to be a pair represented by the term "AB," the pair of transistors 607 and 611 is represented by the term "CD," the pair of transistors 615 and 617 is represented by the term "EF" and the pair of transistors 619 and 623 is represented by the term "GH." The operation is illustrated in the table associated with FIG. 6 with a "+" representing the condition wherein for each pair of the left transistors is on and a "−" represents a condition wherein the right side of the pair is on. For the "+1" level, the switch configuration is such that transistor 605 is on to direct current from node 603 to node 313, transistor 617 is on to direct current from node 616 to node 313. Transistor 607 and transistor 619 are turned on to sink current away from node 315. For the transition "+1" to a "0," transistor 605 is turned off and transistor 601 turned on. It is noted that transistor 605 turns off faster than transistor 601 turns on. This is due to the fact that, when switching a source-coupled pair (SCP), the theoretical differential switching voltage is $\sqrt{2}V_{ON}$. However, to fully switch the transistor on, the voltage should be about $2V_{ON}$, this being due to the subthreshold effect. This means that, as the device is switched off, it will begin to shut off inmmediately, such that one device is turning off faster than the corresponding device is turning on. To accommodate for this, the transistor 617 remains on and transistor 619 is turned off, with transistor 623 turned on. Therefore, even though transistor 605 is turned off faster than transistor 601 is turned on, current will continue to be supplied to node 313 through transistor 617 until transistor 623 is turned on. Turning on the transistor 623 will correspond to the turning on of transistor 601. This will result in a common delay for both transitioning from a "−1" to a "0" and from a "1" to a "0." With this construction, the transition from either a "1" or a "−1" to a "0" in a tri-level system will be free from distortion in that the delay from going to or from a "0" level will be the same. The elimination of distortion comes from the fact that any permissable switching action must switch one P-channel differential pair and one N-channel differential pair. Assuming P-channel differential pairs are matched and N-channel differential pairs are matched, all distortion is eliminated.

Figure 7:
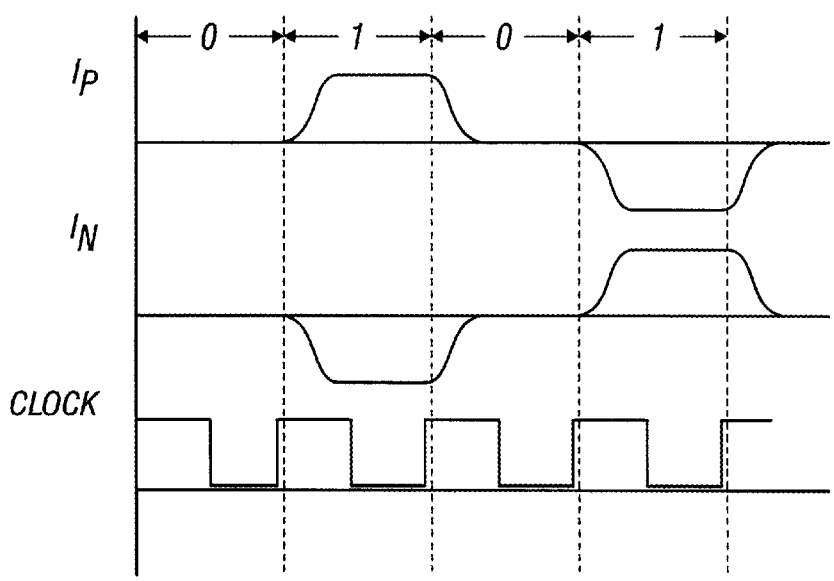
FIG. 7 illustrates waveforms for the current switch of FIG. 6.

Referring now to FIG. 7, there is illustrated a timing diagram of the transitioning between levels for both the positive and negative current outputs. It can be seen that the delays are symmetrical.

Figure 8:
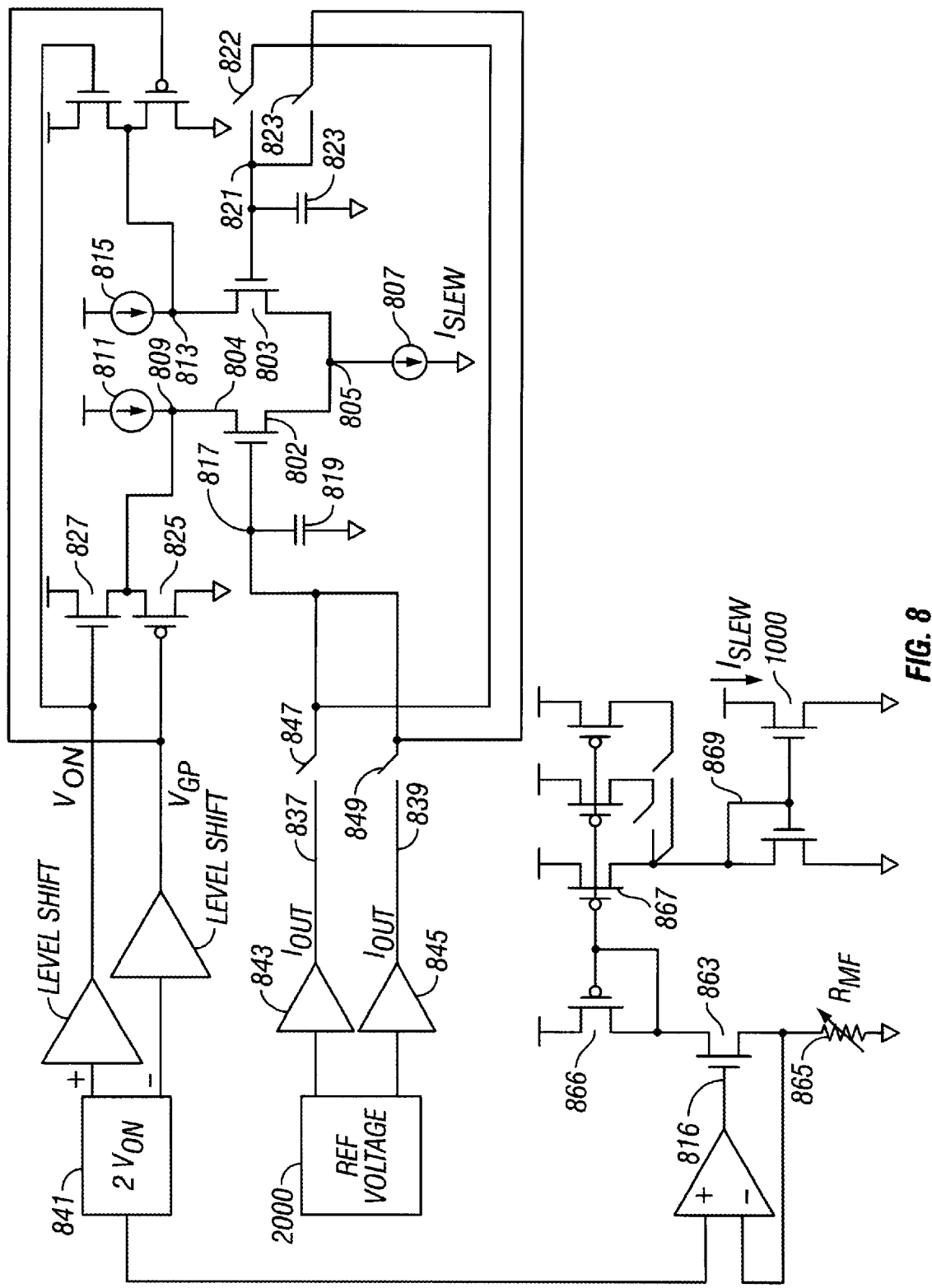
FIG. 8 illustrates a circuit diagram for the slew amp.

Referring now to FIG. 8, there is illustrated a circuit diagram of the slew amp that is contained within the rise time control circuit 317 of FIG. 3. The slew amplifier is comprised of two N-channel transistors 801 and 803 connected in a common source configuration, with the sources connected to a node 805, which node 805 is connected through a current source 807 to ground, the current source 807 having a current $I_{SLEW}$ associated therewith. The gate of transistor 801 is connected to a node 809, which is connected to one side of a current source 811, the other side thereof connected to the supply node. Similarly, transistor 803 has the drain thereof connected to a node 813, which node 813 is connected to one side of a current source 815, the other side thereof connected to the supply node. Current sources 811 and 815, when summed together, equal the current $I_{SLEW}$. The gate of transistor 801 is connected to a node 817 and a capacitor 819 is connected between node 817 and ground, this being the parasitic capacitance of the gate. Similarly, the gate of transistor 803 is connected to a node 821, node 821 connected to one side of a capacitor 823, the other side thereof connected to ground.

The drain of transistor 801 on node 809 is connected to a clamp circuit which is comprised of a P-channel transistor 825 and an N-channel transistor 827. P-channel transistor 825 is connected between node 809 and ground, with the gate thereof connected to a bias voltage $V_{BP}$. N-channel transistor 827 is connected between the supply voltage and node 809, the gate thereof connected to a bias voltage $V_{BN}$. The bias voltages $V_{BN}$ and $V_{BP}$ are selected to define the range over which the node 809 will traverse. The sources of transistors 825 and 827 are connected together with transistor 827 turning on when the voltage on node 809 is $V_{BN}-V_{ON}-V_{TN}$ and the transistor 825 will turn on when the voltage on node 809 is above $V_{BP}+V_{ON}+|V_{TP}|$. Therefore, the voltage on node 809 will traverse in a positive direction from a voltage $V_{BP}+V_{ON}+|V_{TP}|$ to $V_{BN}-V_{ON}-V_{TN}$ in one direction and will traverse the opposite direction for negative slewing. The current driven out of the output nodes 809 and 813 will be a constant current driven to the load capacitance.

In order to adjust the slew rate, there are two trim controls provided. The first trim control is to actually adjust the slew itself. This first trim control is provided for by varying the value of the current in current source 807 and the current in current sources 811 and 815. This first trim control is facilitated through a trim circuit that utilizes a current source configured of a voltage on a node 861 derived from the $2V_{ON}$ voltage block 841. This voltage on node 861 drives the gate of an N-channel transistor 863 which drives an internal p+resistor 865, which is a trimmable resistor similar to the internal resistor 509 of FIG. 5. This is trimmed with the same trim control 511 and references the external resistor 503 such that an absolute value resistor can be obtained. The resistor 865 is proportional to the external resistor 503 and trimmed in accordance with the description hereinabove with reference to FIG. 5. The drain of transistor 863 is connected to one side of a diode-connected P-channel transistor 866, and the source thereof is connected to the supply node. The gate thereof is connected to multiple P-channel transistors 867, and these transistors are connected in parallel with the drains thereof selectively connectable to one side of a diode connected device, which transistor 869 and transistors 1000 mirror the current therein over to the current source 807. In this manner, the current through current source 807 and the current through current sources 811 and 815 can be selected for the slew rate. The value of the current is varied as a function of temperature to account for temperature variations in the value of the voltage to $V_{ON}$. The voltage that drives the gates of transistors 801 and 803 is derived from a voltage source 2000 which generates a voltage of $2V_{ON}$. The reason for this voltage is that a transistor will turn on when the voltage is $\sqrt{2}V_{ON}$, and this voltage will be more than sufficient to turn the system on. This provides a differential voltage on two differential lines which are input to respective buffers 843 and 845, that are operable to provide a low impedance output drive to nodes 837 and 839, respectively. Two switches 847 and 849 are operable to connect nodes 837 and 839 to node 817 at different times. Similarly, two switches 821 and 823 are operable to connect nodes 837 and 839 to node 821 at different times. As such, node 837 can be connected to node 817, wherein node 839 can be connected to node 821 for slewing in one direction and in the opposite direction for slewing in the opposite direction. This connection allows the voltage generated by the voltage generator block 2000 to be applied across the differential amplifier configuration comprised of transistors 801 and 803 to slew from one clamp voltage to the next with a constant output which drives a capacitive load.

Figure 9:
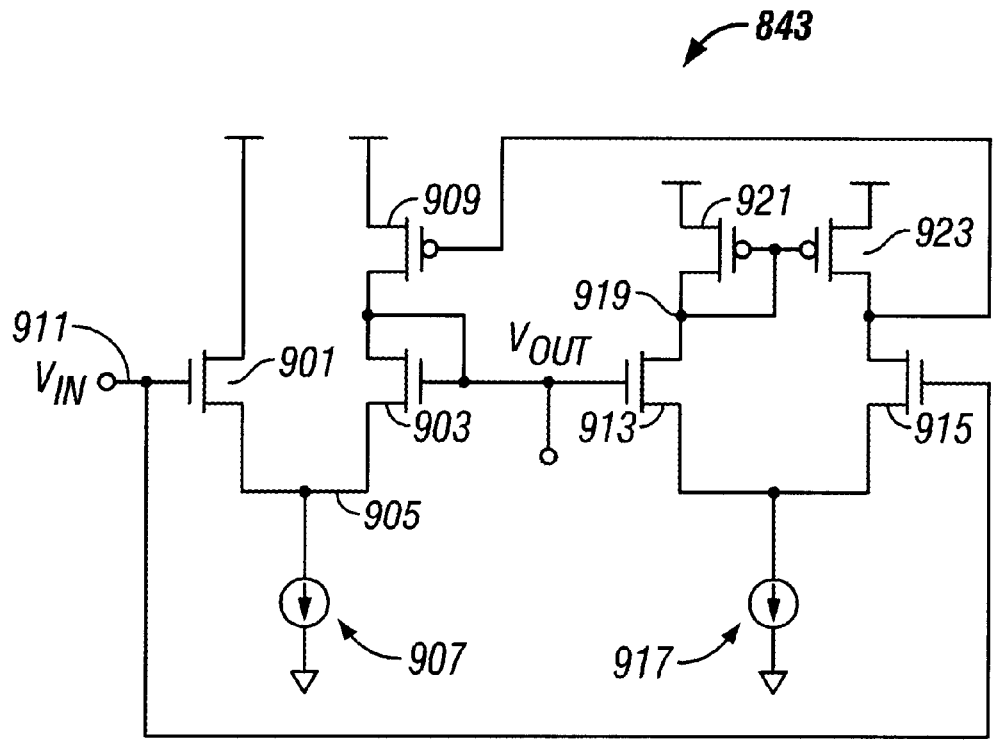
FIG. 9 illustrates a schematic diagram of the unity gain high speed buffer.

Referring now to FIG. 9, there is illustrated a schematic diagram of each of the buffers 843 and 845. The buffers 843 and 845 essentially replace a conventional source follower that inherently provides a high bandwidth operation. However, a normal source follower suffers several limitations. One is due to the body effect that combines with the output impedance to limit the overall circuit gain to less than one. Additionally, the source follower introduces a level shift of one threshold voltage that must be accounted for. An alternative to the source follower is the use of an operational amplifier with its output tied to its inverting input to provide a gain of approximately one. Although this eliminates the level shift, it has a relatively low bandwidth.

In FIG. 9, the buffer 843 includes a differential amplifier construction having a differential pair of N-channel transistors 901 and 903 with the sources thereof connected together and to a node 905. Node 905 is connected to one side of a current source 907, the other side thereof connected to ground. The drain of transistor 901 is connected to the supply voltage, the gate thereof connected to a node 911 which is the input voltage $V_{IN}$. The drain of transistor 903 is connected to the drain of transistor 909 is connected to a control voltage and the source thereof to the supply voltage. Without more, this circuit would have a small residual level shift. However, to account for this level shift, an operational amplifier is provided for adjusting the current through transistor 909. This is facilitated with a pair of N-channel transistors 913 and 915 having the sources thereof connected together to one side of the source/drain path of a current source 917, the other side thereof connected to ground. The drain of transistor 913 is connected to a node 919 and the gate thereof connected to the output terminal $V_{OUT}$, which is connected to the gate of transistor 903. The node 919 is connected to one side of a diode-connected P-channel transistor 921, the other side thereof connected to the supply voltage and the gate thereof connected to the gate of a P-channel transistor 923. The P-channel transistor 923 has the source/drain path thereof connected between the supply node and drain of transistor 915. The gate of transistor 915 is connected to node 911, the input voltage. Therefore, the operational amplifier comprised of transistors 913 and 915 has one input thereof connected to the output voltage and the other input thereof connected to the input voltage with the output of the amplifier essentially controlling the current through current source 909. The gate of the transistor 909, which is a current source, is connected to the drain of transistor 915 such that the current therethrough is varied in a feedback loop such that the level shift is removed.

The circuit of FIG. 9 has a relatively large bandwidth since there are no high impedance nodes in the signal path. The circuit also provides a very high accuracy at moderate frequencies due to the feedback amplifier. At higher frequencies, the circuit will exhibit a gain that is less than one, as the feedback amplifier rolls off causing the circuit to exhibit the gain lower than one as a follower would. However, the feedback will still have introduced a bias such that the level shift is approximately zero and there is still a signal path through transistors 901 and 903.

Figure 10:
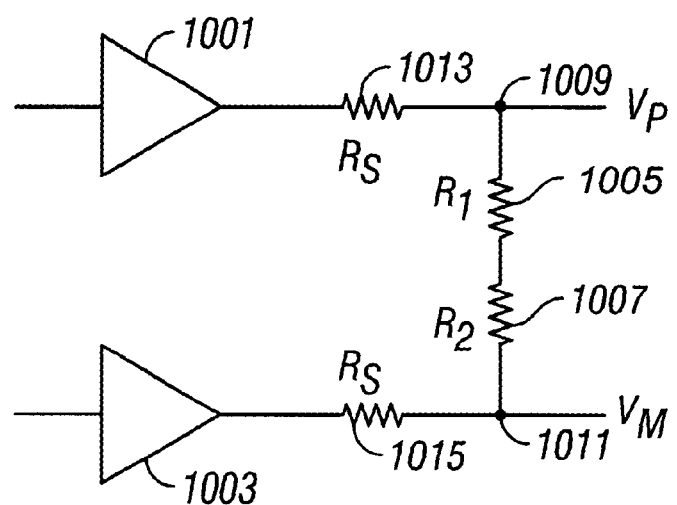
FIG. 10 illustrates a diagrammatic view of the output driver for a prior art system.

Referring now to FIG. 10, there is illustrated a diagrammatic view of a prior art driver. The prior art driver provides a differential output and is comprised of a first driver 1001 for one polarity of the output and a second driver 1003 for a second polarity. The driver 1001 is required to drive the load which is comprised of two load resistors 1005 and 1007 disposed in series between the two output nodes 1009 associated with the positive voltage $V_P$ and an output node 1011 associated with the negative output voltage $V_M$. Each of the drivers 1001 and 1003 has associated therewith a series source resistance 1013 and 1015, respectively. The source resistances 1013 and 1015 determine the impedance looking back into the respective drivers 1001 and 1003. This resistance must be the same resistance looking from the driver into the nodes 1009 and 1011, i.e., 100 Ohms. Therefore, there will be a large voltage drop across resistor 1013 attributed to the voltage divider provided by resistors 1005, 1007, 1013 and 1015.

To solve this problem, a constant impedance output driver has been developed which utilizes a current driven node which has a constant output impedance. This is described in U.S. Pat. No. 5,121,080, issued Jun. 9, 1992, which is incorporated herein by reference.

Figure 11:
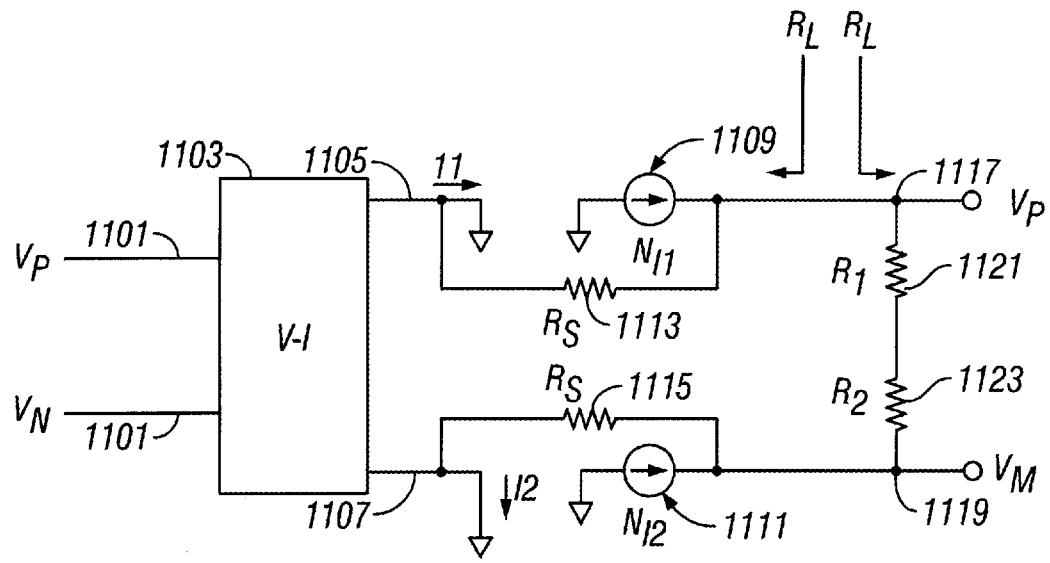
FIG. 11 illustrates a block diagram of the constant output impedance driver.

Referring now to FIG. 11, there is illustrated a diagrammatic view of the constant output impedance driver of the present invention. The internal voltage that is generated by the transceiver is comprised of a positive and negative voltage on two lines 1101. This is input to a voltage-to-current circuit 1103, equivalent to the V-to-I circuit 303 of FIG. 3, which is operable to generate two currents, a first current on a line 1105 and a second current on a line 1107. These currents are buffered by output current buffers/drivers 1109 and 1111, respectively. Each of these has associated therewith an internal resistance 1113 and 1115, respectively. These currents drive output nodes 1117 and 1119, respectively, associated with the positive and negative voltages, $V_P$ and $V_M$ for the output. This is represented by load resistors 1121 and 1123, corresponding to resistors 1005 and 1007 of FIG. 10. There is represented a phantom line indicating that the impedance looking into the amplifier into the load as being the same, $R_L$. In operation, as will be described hereinbelow, an external resistor is utilized which is a precision resistor having a very low thermal coefficient and an internal resistor that has a thermal coefficient that tracks the variations in the integrated circuit utilized to fabricate the transceiver. These two resistors are utilized to generate two currents which are then summed to yield a temperature independent output, as described hereinabove.

Figure 12:
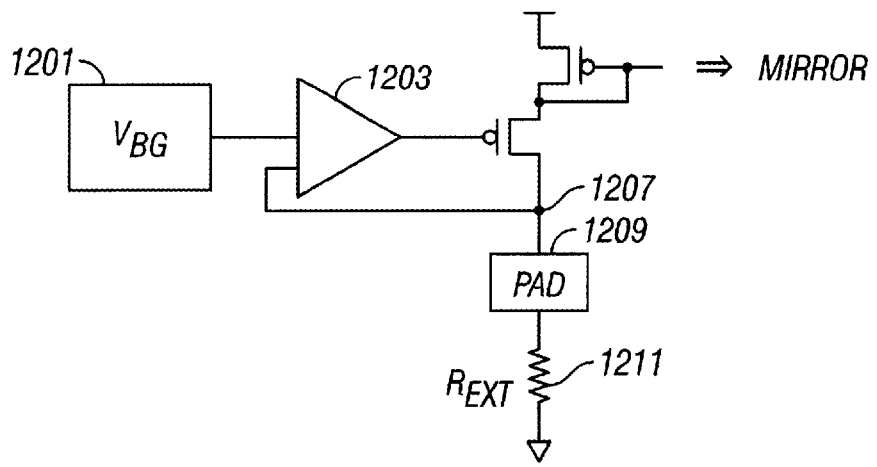
FIG. 12 illustrates a circuit for generating the internal voltage.

Referring now to FIG. 12, there is illustrated a schematic diagram of the circuitry for generating the two currents, the temperature independent current and the temperature dependent current, which currents can then be scaled, as will be described hereinbelow. A bandgap voltage generator 1201 is provided, which bandgap voltage generator is operable to generate a very stable temperature independent voltage $V_{BG}$. This bandgap voltage generator 1201 is a conventional and well-known circuit. The voltage is output to an amplifier 1203 that drives the gate of a P-channel transistor 1204, the source/drain path thereof connected between one side of the current mirror 1205 and a node 1207. Node 1207 is connected back to the other input of the amplifier 1203 such that it is configured in a source follower configuration. The current mirror 1205 sources current from the power supply node. Node 1207 is connected to a pad 1209 which is connected to one side of an external resistor 1211 labeled "$R_{EXT}$." Resistor 1211 has the other side thereof connected to ground and has a very low temperature coefficient. The current in the current mirror 1205 is dependent upon the value of resistor 1211 and the voltage of the bandgap generator 1201. Therefore, the current through transistor 1204 is equal to the current through current mirror 1205 which is equal to $V_{BG}/R_{EXT}$. Similarly, a second current that is temperature dependent and tracks the variation of the integrated circuit is generated by the voltage-to-current converter 303 (the $I_{OTC}$ in FIG. 4).

Figure 13:
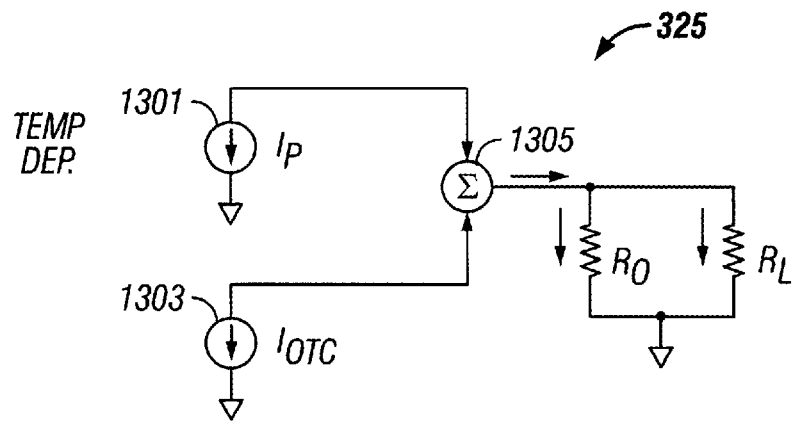
FIG. 13 illustrates a simplified diagram for the output buffer current summing operation.

Referring now to FIG. 13, there is illustrated a simplified diagrammatic view of the output buffer 325. As noted above, the output buffer must drive the output load $R_L$ with an internal impedance $R_O$. The internal impedance $R_O$ is realized with a P+ resistor whereas the output load is an external resistor that has a very low temperature coefficient. Therefore, the current flowing to the output will be split equally between the load resistor and the internal impedance. The current output buffer drives essentially one-half of the current from a current source 1301, a temperature dependent current source labeled "$I_p$." The other half of the current is derived from a current source 1303 which is a temperature independent current source labeled "$I_{OTC}$." The current source 1303 and the current source 1301 are summed together in a summing device 1305 to output the current to the internal impedance and the load impedance. As will be described hereinbelow, the current source 1301 is derived from resistors that are the same type of resistors as the internal impedance $R_O$ whereas the current from the current source 1303 is derived from a resistor having a temperature coefficient that is substantially the same as the load impedance. Of course, it is also important to note that this is a constant impedance output such that $R_O$ is constant over temperature.

Figure 14:
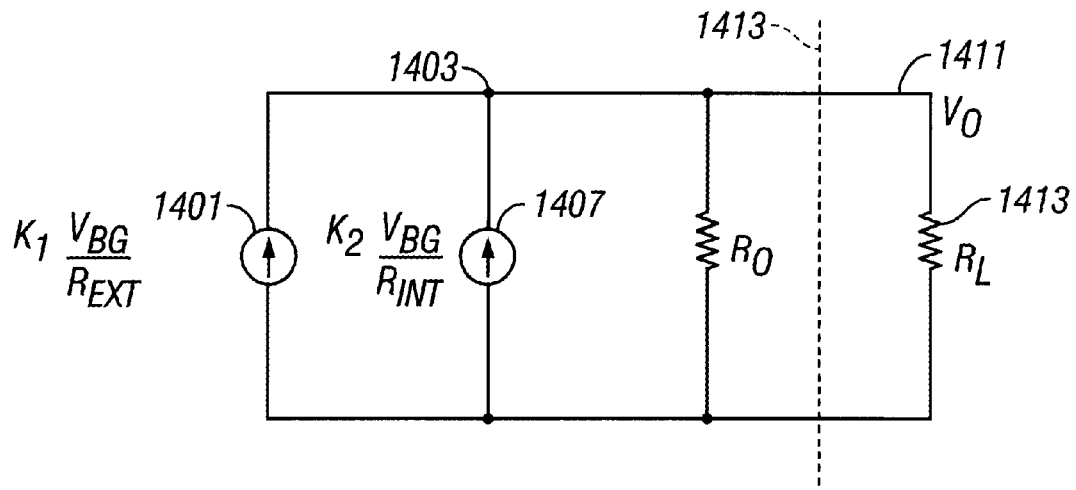
FIG. 14 illustrates an equivalent circuit diagram for the output driver.

Referring now to FIG. 14, there is illustrated an equivalent circuit for the output driver showing two current sources, a current source 1401 connected between a node 1403 and a ground node 1405 and a current source 1407 connected between node 1403 and ground node 1405. The impedance of the output drivers represented by a resistance 1409 disposed between node 1403 and ground node 1405. Node 1403 is connected to an output node 1411 on the opposite side of a phantom line 1413 and is labeled "$V_O$" for the output voltage, which output voltage is derived by driving the current through a load resistor 1413, labeled "$R_L$." The current through current source 1401 is a function of the external resistor 1311, this being $K_1 V_{BG}/R_{EXT}$, and the current through current source 1407 is generated by the voltage-to-current converter 303 and is proportional to $K_2 V_{BG}/R_{INT}$.

The resistance values $R_{EXT}$ and $R_{INT}$ are selected and then scaled by scale factors $K_1$ and $K_2$, respectively. Further, the value of $R_{EXT}$ is scaled from the value of $R_L$ by a factor of N and the value of $R_{INT}$ is scaled from the output impedance to the driver by a factor of M. The values of $K_1$ and $K_2$ and the values of N and M are determined by the following equations:

$$V_0 = V_{BG}\left(\frac{K_1}{R_{EXT}} + \frac{K_2}{R_{INT}}\right)\frac{1}{\frac{1}{R_O} + \frac{1}{R_L}} \tag{1}$$

$$R_{EXT} = N \times R_L \tag{2}$$

$$R_{INT} = M \times R_O \tag{3}$$

$$V_O = V_{BG}\frac{\frac{K_1}{N \times R_L} + \frac{K_2}{M \times R_O}}{\frac{1}{R_O} + \frac{1}{R_L}} \tag{4}$$

$$\frac{K_1}{N} = \frac{K_2}{M} = C; \text{ then } V_O = CV_{BG} \tag{5}$$

It can be seen that if the ratio of $K_1/N$ is set equal to the ratio of $K_2/M$, this will equal a constant such that the output voltage is then a constant multiplied by the band gap voltage. Therefore, if the bandgap voltage is temperature independent, then the output voltage is temperature independent.

Figure 15:
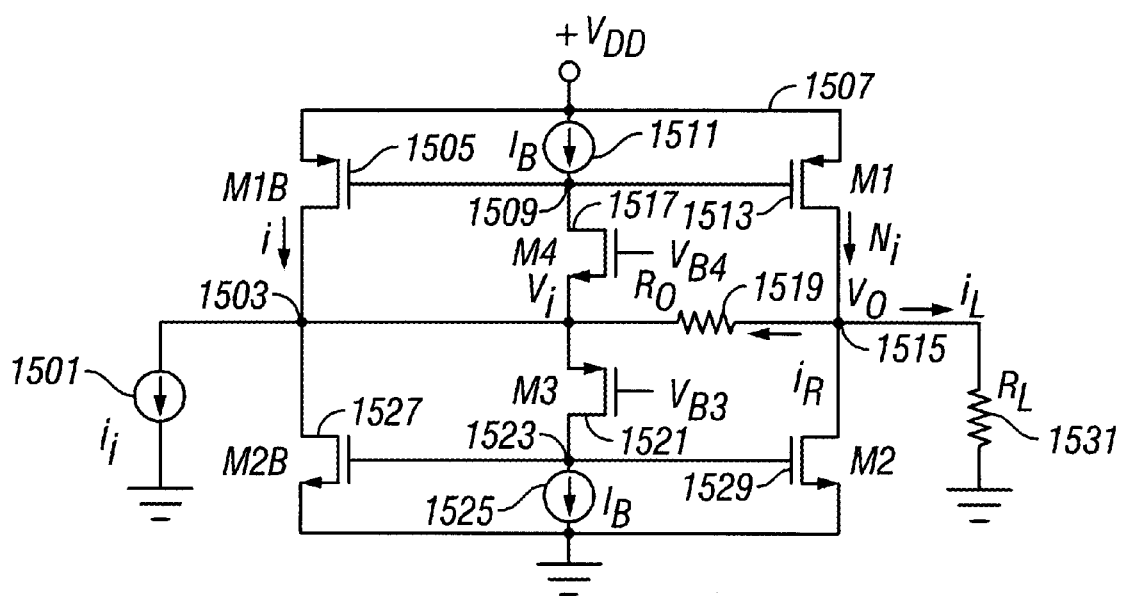
FIG. 15 illustrates a schematic diagram for the output driver.

Referring now to FIG. 15, there is illustrated a schematic diagram of the output amplifier 121. An input current source 1501 is provided for providing an input current $i_i$. This is a switched current, as was the case with the current through current source 1407. The current in current source 1407 is switched as a function of the logic state, such that it does change. However, it changes between constant levels. The current source 1501 is connected between node 1503 and ground. A P-channel transistor 1505 is connected between node 1503 and a power supply node 1507, the gate thereof connected to a node 1509. A current source 1511 is connected between node 1507 and node 1509 with a current $I_B$. A P-channel transistor 1513 has the source/drain path thereof connected between node 1507 and an output voltage node 1515, labeled "$V_O$." The gate of transistor 1513 is connected to node 1509. An N-channel transistor 1517 has the source/drain path thereof connected between node 1509 and node 1503 and labeled "$V_I$" for the input voltage. The gate of transistor 1517 is connected to a bias voltage $V_{B4}$. A resistor 1519 is connected between node 1503 and node 1515. A P-channel transistor 1521 has the source/drain path thereof connected between node 1503 and a node 1523 and the gate thereof connected to a bias voltage $V_{B3}$. Current source 1525 is connected between node 1523 and ground and labeled "$I_V$." An N-channel transistor 1527 has the source/drain path thereof connected between node 1503 and ground and the gate thereof connected to node 1523, and an N-channel transistor 1529 has the source/drain path thereof connected between node 1515 and ground and the gate thereof connected to node 1523. A load resistor 1531 is connected between output node 1515 and ground and labeled "$R_L$." The current through resistor 1531 is the output current or load current $i_L$.

If node 1503 is assumed to be a virtual ground node and the current through transistor 1505 is set to be i and the current through transistor 1513 is a factor of N greater than i, current through transistor 1505, the following equations will set forth how the value of the resistor 1519 labeled "$R_O$" is set, it being seen that the value of $R_O$ is $(N+1)R_L$.

$$i = i + \frac{V_O}{R} \qquad (6)$$

$$Ni = \frac{V_O}{R} + \frac{V_O}{R_L} \qquad (7)$$

$$\Rightarrow Ni_i = N\frac{V_O}{R} + \frac{V_O}{R} + \frac{V_O}{R_L} \Rightarrow \qquad (8)$$

$$Ni_i = \frac{V_O}{R_L} + \frac{V_O}{R}(N+1) \qquad (9)$$

$$\Rightarrow Ni_i R_L = V_O + V_O\left(\frac{R_L}{R}\right)(N+1) \qquad (10)$$

$$\frac{V_O}{V_i} = \frac{NR_L}{1 + (N+1)(R_L/R)} \qquad (11)$$

$$\frac{V_O}{i_i} = \frac{N\,R}{N+1}\cdot\frac{R_L}{R_L + \frac{R}{N+1}} \qquad (12)$$

$$\frac{V_O}{i_i} = N\frac{R_O R_L}{R_O + R_L} \qquad (13)$$

or, since $$V_O = i_L R_L \Rightarrow \frac{V_O}{i_i} = \frac{N}{\frac{1}{R_O} + \frac{1}{R_L}} = \frac{N}{2}R_L \text{ for } R_0 = (N+1)R_L \qquad (14)$$

$$\frac{i_i}{i_i} = \frac{N}{1 + (N+1)(R_L/R_O)} = \frac{N\bullet}{2} \text{ for } R_0 = (N+1)R_L \qquad (15)$$

Although the preferred embodiment has been described in detail, it should be understood that various changes, substitutions and alterations can be made therein without departing from the spirit and scope of the invention as defined by the appended claims.

What is claimed is:

1. A multi-path unity gain buffer circuit, comprising:
   a feed-forward signal path having a differential amplifier which includes a pair of transistors and a current source coupled together wherein the feed-forward signal path provides high frequency, low accuracy buffering operation; and
   a feedback signal path coupled to the feed-forward signal path wherein the feedback signal path has an operational amplifier which includes a pair of N-channel transistors, a pair of P-channel transistors, and another current source coupled together and a tuning transistor coupled to the operational amplifier and the differential amplifier and wherein the feedback signal path provides a low frequency, high bandwidth buffering operation.

2. The multi-path unity gain buffer circuit according to claim 1, wherein:
   sources of the pair of transistors are coupled to each other, drains of the pair of transistors are coupled to a supply voltage, a gate of one of the pair of transistors is coupled to an input voltage and another gate of another one of the pair of transistors is coupled to an output terminal for providing an output voltage of the feed-forward signal path; and
   the current source coupled between the sources of the pair of transistors and ground.

3. The multi-path unity gain buffer circuit according to claim 2, wherein the pair of transistors is another pair of N-channel transistors.

4. The multi-path unity gain buffer circuit according to claim 2, wherein the tuning transistor tunes a current amount flowing therethrough.

5. The multi-path unity gain buffer circuit according to claim 2, wherein:
   sources of the pair of N-channel transistors are coupled to each other, a gate of one of the pair of N-channel transistors is coupled to the another gate of the another one of the pair of transistors and the output terminal for providing the output voltage, and another gate of another one of the pair of N-channel transistors is coupled to the gate of the one of the pair of transistors and the input voltage;
   the another current source coupled between the sources of the pair of N-channel transistors and ground; and
   drains of the pair of P-channel transistors are coupled to the supply voltage, a source of one of the pair of P-channel transistors is coupled to the drain of the one of the pair of N-channel transistors, another source of another one of the pair of P-channel transistors is coupled to the another drain of the another one of the pair of N-channel transistors, gates of the pair of P-channel transistors are coupled to each other and to the drain of the one of the pair of N-channel transistors, and the source of the another one of the pair of P-channel transistors is coupled to a gate of the tuning transistor.

6. The multi-path unity gain buffer circuit according to claim 5, wherein a source of the tuning transistor is coupled to the drain of the another one of the pair of transistors in the feed-forward signal path, the gate of the tuning transistor is coupled to the source of the another one of the pair of P-channel transistors, and the drain of the tuning transistor is coupled to the supply voltage.

7. The multi-path unity gain buffer circuit according to claim 1, wherein:

sources of the pair of N-channel transistors are coupled to each other, a gate of one of the pair of N-channel transistors is coupled to the output terminal for providing the output voltage, and another gate of another one of-the pair of N-channel transistors is coupled to the input voltage;

the another current source coupled between the sources of the pair of N-channel transistors and ground; and drains of the pair of P-channel transistors are coupled to the supply voltage, a source of one of the pair of P-channel transistors is coupled to the drain of the one of the pair of N-channel transistors, another source of another one of the pair of P-channel transistors is coupled to the another drain of the another one of the pair of N-channel transistors, gates of the pair of P-channel transistors are coupled to each other and to the drain of the one of the pair of N-channel transistors, and the source of the another one of the pair of P-channel transistors is coupled to a gate of the tuning transistor.

8. A method for buffering by a multi-path unity gain buffer circuit, comprising:

providing high frequency, low accuracy buffering operations through a feed-forward signal path having a differential amplifier which includes a pair of transistors and a current source coupled together; and providing low frequency, high bandwidth buffering operations through a feedback signal path coupled to the feed-forward signal path wherein the feedback signal path has an operational amplifier which includes a pair of N-channel transistors, a pair of P-channel transistors, and another current source coupled together and a tuning transistor coupled to the operational amplifier and the differential amplifier.

9. The method according to claim 8, wherein sources of the pair of transistors are coupled to each other, drains of the pair of transistors are coupled to a supply voltage, a gate of one of the pair of transistors is coupled to an input voltage and another gate of another one of the pair of transistors is coupled to an output terminal for providing an output voltage of the feed-forward signal path; and the current source coupled between the sources of the pair of transistors and ground.

10. The method according to claim 8, wherein:

sources of the pair of N-channel transistors are coupled to each other, a gate of one of the pair of N-channel transistors is coupled to the another gate of the another one of the pair of transistors and the output terminal for providing the output voltage, and another gate of another one of the pair of N-channel transistors is coupled to the gate of the one of the pair of transistors and the input voltage;

the another current source coupled between the sources of the pair of N-channel transistors and ground; and drains of the pair of P-channel transistors are coupled to the supply voltage, a source of one of the pair of P-channel transistors is coupled to the drain of the one of the pair of N-channel transistors, another source of another one of the pair of P-channel transistors is coupled to the another drain of the another one of the pair of N-channel transistors, gates of the pair of P-channel transistors are coupled to each other and to the drain of the one of the pair of N-channel transistors, and the source of the another one of the pair of P-channel transistors is coupled to a gate of the tuning transistor.

11. The method according to claim 8, wherein the tuning transistor tunes a current amount flowing therethrough.

12. A method for buffering a slew amplifier, comprising:

outputting, by a slew amplifier, a differential voltage between two voltage signals on two differential voltage lines; and inputting the two voltage signals on the two differential voltage lines into two respective buffer circuits wherein each of the two respective buffer circuits provides high frequency, low accuracy buffering operations through a feed-forward signal path and low frequency, high bandwidth buffering operations through a feedback signal path having an operational amplifier coupled to an output terminal of the feed-forward signal path; and a tuning transistor coupled to the operational amplifier wherein the tuning transistor tunes a current amount flowing therethrough;

wherein the feed-forward signal path further comprises:

a pair of transistors wherein sources of the pair of transistors are coupled to each other, drains of the pair of transistors are coupled to a supply voltage, a gate of one of the pair of transistors is coupled to an input voltage and another gate of another one of the pair of transistors is coupled to an output terminal for providing an output voltage of the feed-forward signal path; and a current source coupled between the sources of the pair of transistors and ground.

13. A method for buffering a slew amplifier, comprising:

outputting, by a slew amplifier, a differential voltage between two voltage signals on two differential voltage lines; and inputting the two voltage signals on the two differential voltage lines into two respective buffer circuits wherein each of the two respective buffer circuits provides high frequency, low accuracy buffering operations through a feed-forward signal path and low frequency, high bandwidth buffering operations through a feedback signal path; and wherein the feed-forward signal path comprises a pair of transistors wherein sources of the pair of transistors are coupled to each other, drains of the pair of transistors are coupled to a supply voltage, a gate of one of the pair of transistors is coupled to an input voltage and another gate of another one of the pair of transistors is coupled to an output terminal for providing an output voltage of the feed-forward signal path and a current source coupled between the sources of the pair of transistors and ground.

14. The method according to claim 13, wherein the feedback signal path further comprises:

an operational amplifier coupled to the output terminal of the feed-forward signal path; and a tuning transistor coupled to the operational amplifier wherein the tuning transistor tunes a current amount flowing therethrough.

15. A multi-path unity gain buffer circuit, comprising:

a high frequency signal path having a differential amplifier powered for providing a high frequency, low accuracy buffering operation; and a low frequency signal path coupled to the high frequency signal path wherein the low frequency signal path has an operational amplifier powered to provide a low frequency, high bandwidth buffering operation, wherein an output of the operational amplifier is fed back to an input of the operational amplifier through a current varying element that varies current levels of the input of the operational amplifier to remove a level shift of an output signal of the differential amplifier;

wherein the operational amplifier further comprises:

a pair of N-channel transistors;

a pair of P-channel transistors coupled to the pair of N-channel transistors; and a current source coupled to the pair of N-channel transistors.

16. The multi-path unity gain buffer circuit according to claim 15, wherein the differential amplifier of the high frequency signal path further comprises:

a pair of transistors wherein sources of the pair of transistors are coupled to each other, drains of the pair of transistors are coupled to a supply voltage, a gate of one of the pair of transistors receives an input signal and another gate of another one of the pair of transistors provides the output signal of the differential amplifier; and a current source coupled between the sources of the pair of transistors and ground.

17. The multi-path unity gain buffer circuit according to claim 16, wherein the pair of transistors is a pair of N-channel transistors.

18. The multi-path unity gain buffer circuit according to claim 15, wherein the current varying element further comprises:

a tuning transistor coupled to the differential amplifier and the operational amplifier wherein the tuning transistor tunes the current levels of the input of the operational amplifier to remove the level shift of the output signal of the differential amplifier.

* * * * *

UNITED STATES PATENT AND TRADEMARK OFFICE
CERTIFICATE OF CORRECTION

PATENT NO.    : 6,559,692 B2
DATED         : May 6, 2003
INVENTOR(S)   : Eric Kimball It is certified that error appears in the above-identified patent and that said Letters Patent is hereby corrected as shown below:

Title page,
Item [75], Inventors, please delete "Perry Heedley, Folsom, CA (US); Baker Scott, Boulder, CO (US); Eric Smith, Austin, TX (US); Stephen Hodapp, Austin, TX (US); Sumant Ranganathan, Folsom, CA (US); Mohammad Navabi, Phoenix, AZ (US)".

Signed and Sealed this

Thirtieth Day of December, 2003

JAMES E. ROGAN
*Director of the United States Patent and Trademark Office*